US009191726B2

(12) United States Patent
Christianson et al.

(10) Patent No.: US 9,191,726 B2
(45) Date of Patent: Nov. 17, 2015

(54) SYSTEM AND METHOD FOR PROVIDING MEDIA CONTENT ENHANCEMENT

(75) Inventors: Ryan Christianson, Lynnwood, WA (US); John Kehle, Kirkland, WA (US)

(73) Assignee: Disney Enterprises, Inc., Burbank, CA (US)

( * ) Notice: Subject to any disclaimer, the term of this patent is extended or adjusted under 35 U.S.C. 154(b) by 536 days.

(21) Appl. No.: 12/587,075

(22) Filed: Sep. 30, 2009

(65) Prior Publication Data

US 2011/0078753 A1    Mar. 31, 2011

(51) Int. Cl.
*H04N 7/10* (2006.01)
*H04N 21/85* (2011.01)
*G06Q 30/02* (2012.01)
*H04N 21/4147* (2011.01)
*H04N 21/435* (2011.01)
*H04N 21/61* (2011.01)
*H04N 21/81* (2011.01)

(52) U.S. Cl.
CPC ........... *H04N 21/85* (2013.01); *G06Q 30/02* (2013.01); *H04N 21/4147* (2013.01); *H04N 21/435* (2013.01); *H04N 21/6125* (2013.01); *H04N 21/8133* (2013.01); *H04N 21/8166* (2013.01)

(58) Field of Classification Search
CPC ............ H04N 21/435; H04N 21/6125; H04N 21/8133; H04N 21/8166; H04N 21/85; H04N 21/434; H04N 21/80
See application file for complete search history.

(56) References Cited

U.S. PATENT DOCUMENTS

| 6,577,346 | B1 * | 6/2003 | Perlman .................... 348/460 |
| 2002/0059633 | A1 | 5/2002 | Harkness |
| 2007/0061724 | A1 * | 3/2007 | Slothouber et al. .......... 715/716 |
| 2008/0244681 | A1 | 10/2008 | Gossweiler et al. |
| 2009/0111448 | A1 | 4/2009 | Paila |
| 2009/0172746 | A1 | 7/2009 | Aldrey et al. |
| 2010/0107189 | A1 * | 4/2010 | Steelberg et al. ............ 725/32 |
| 2010/0138867 | A1 * | 6/2010 | Wong et al. .................. 725/46 |
| 2010/0251278 | A1 * | 9/2010 | Agarwal et al. ............. 725/9 |
| 2010/0306808 | A1 * | 12/2010 | Neumeier et al. ........... 725/105 |

FOREIGN PATENT DOCUMENTS

| JP | 11-275536 | 10/1999 |
| JP | 2001-309349 | 11/2001 |
| JP | 2006-60426 | 3/2006 |
| KR | 10-2008-0023891 | 3/2008 |
| KR | 10-2008-0072343 | 8/2008 |
| KR | 10-2009-0044506 | 5/2009 |
| WO | WO 2009057950 A2 * | 5/2009 |
| WO | 2009/117372 | 9/2009 |

* cited by examiner

*Primary Examiner* — Rong Le
(74) *Attorney, Agent, or Firm* — Farjami & Farjami LLP

(57) ABSTRACT

There are provided systems and methods for providing media content enhancement. A system for providing enhancement of media content displayed by a presentation unit of the system comprises the presentation unit configured to receive and display the media content, and a content enhancement module stored in a memory of the presentation unit. The presentation unit also includes a processor configured to control the content enhancement module to enhance the media content. A method for use by the content enhancement module comprises reading a context data received by the presentation unit, the context data describing a media content provided for display by the presentation unit, processing the context data to identify the media content, requesting an enhancement data corresponding to the media content, and executing instructions received in the enhancement data to enhance the media content displayed by the presentation unit.

19 Claims, 3 Drawing Sheets

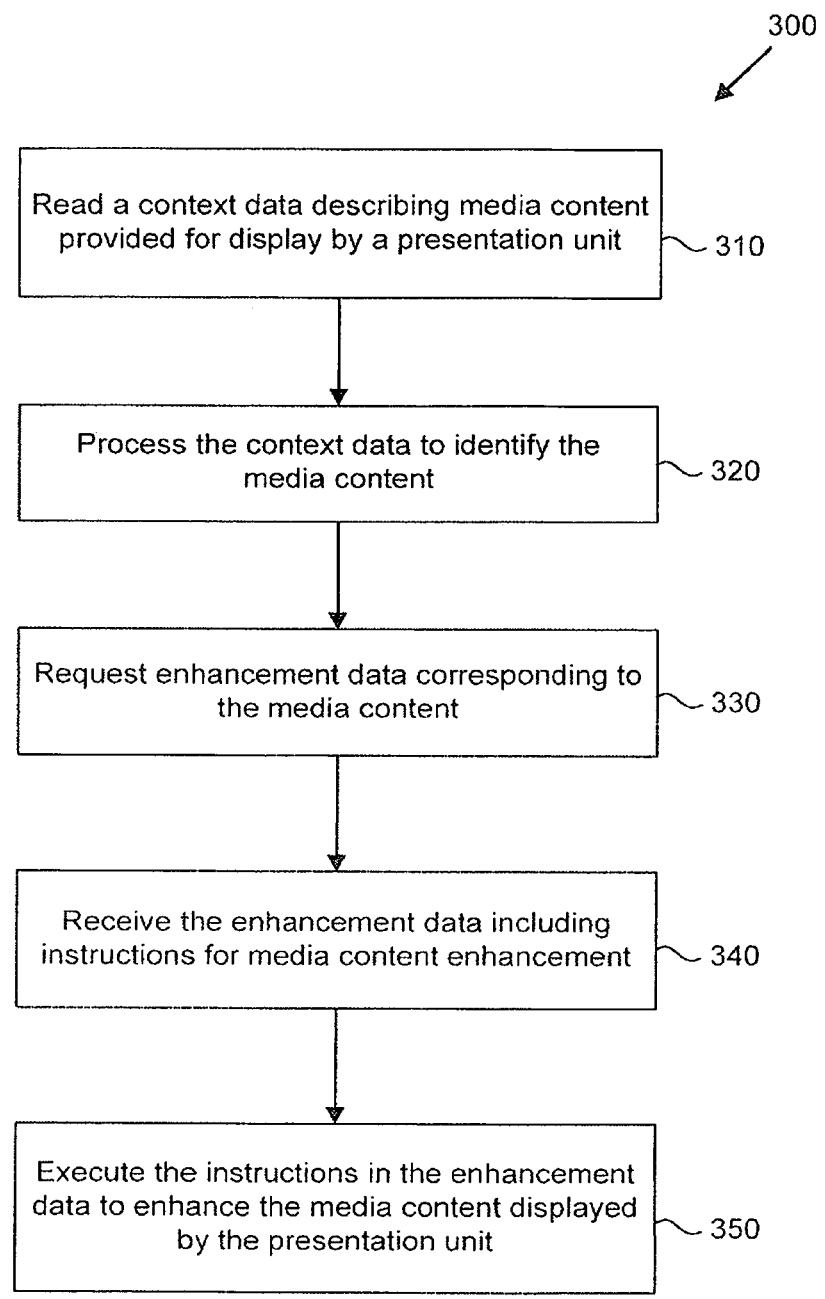

SYSTEM AND METHOD FOR PROVIDING MEDIA CONTENT ENHANCEMENT

BACKGROUND OF THE INVENTION

1. Field of the Invention

The present invention relates generally to the presentation of media content. More particularly, the present invention relates to enhancement of media content by a presentation system configured to receive the media content.

2. Background Art

The increased sophistication of consumer electronics devices has rendered the consumption of media content a more interactive process than ever before. Whereas media consumers, such as television (TV) viewers, were once passive recipients of media content entirely determined by relatively few broadcasters, and available for viewing only on a fixed schedule, media consumers now wield considerable control over the substance and timing of what they choose to view. For example, the wide distribution of digital video recorders (DVRs) has largely decoupled television programming content from the fixed schedules of the past, enabling consumers to store programming received by their cable tuners or set-top boxes, for viewing and repeated viewing according to personal scheduling preferences.

Although liberating for the typical consumer, DVRs and other media content storage devices have created challenges for media content providers and the advertisers on whom many of those providers rely for sponsorship of their programming. One challenge flows from the fact that media content providers are now forced to compete for viewer interest in each of their products over the entire viewing day.

Historically, media content provider "A" competed with media content providers "B" and "C" in discrete time slots, in which market research data could suggest that the majority of viewers would be of a certain age or prefer a certain format of content, such as family oriented content between 5:00 p.m. and 8:00 p.m., for example. As a result, media content providers could focus on providing family content in that time slot that was more appealing than that offered by competitors, without substantial concern about competition from other genres of media content during that viewing period, or their own content produced for viewing at other times. Now, however, each item of media content offered by a media content provider must compete with every other item offered by that media content provider, as well as every item of content offered by every other media content provider, across every hour of the viewing day.

In the face of such increased competition for viewer attention, information about consumer viewing habits becomes especially critical for the competitive success of both media content providers and their advertisers. However, another challenge resulting from greater consumer control over viewing, is that market research data is more difficult to gather. For example, because media content consumption is substantially decoupled from media content delivery, it is now more difficult to determine what programming is being viewed, at what hour it is being viewed, how many times it is being viewed, and by whom it is being viewed. Consequently, effective advertising placement may become more difficult and costly to achieve for potential media content sponsors, perhaps discouraging their support for otherwise praiseworthy or socially beneficial programming.

One recent approach to stimulating consumer interest in a particular brand of media content, such as a serialized TV drama for example, is the distribution of consumer software applications for producing a small viewing window on a consumer's television screen that displays graphics and perhaps text promoting the particular brand. Such applications, sometimes called "widgets," are typically specific to a particular television series or broadcast network. Widgets may be designed to be customizable by the consumer. For example, the consumer may be able to control language, font, display size, and even some of the substance of the content displayed by the widget, which typically executes independently of content concurrently displayed on the TV or other presentation system.

Because they are designed to attract and engage a viewer's attention, however, widgets provided to promote a particular media content, while perhaps encouraging a consumer to view the media content, may in fact distract the viewer from being attentive to the media content while it is being presented. In addition, widgets associated with particular media content may be used by a consumer as an entertaining diversion from advertisements promoting the products or services of sponsors of that programming.

Accordingly, there is a need to overcome the drawbacks and deficiencies in the art by providing a solution for encouraging viewer interest in broadcast media content that enhances a consumer viewing experience while avoiding distraction from the broadcast media content or its associated advertising.

SUMMARY OF THE INVENTION

A system and method for providing media content enhancement, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 is a flowchart presenting a method for providing media content enhancement, according to one embodiment of the present invention.

DETAILED DESCRIPTION OF THE INVENTION

Figure 1:
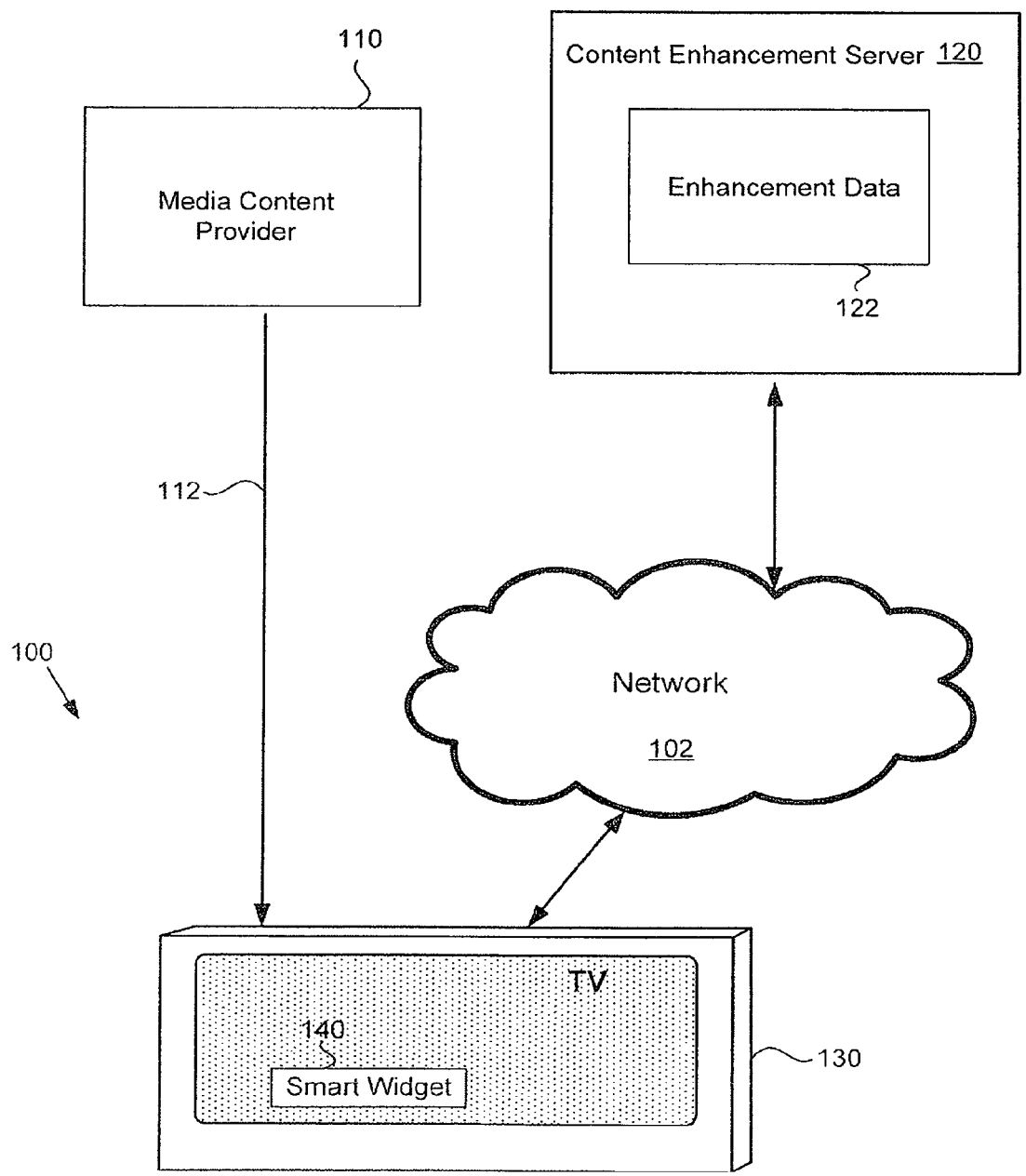
FIG. 1 shows a diagram of an example system for providing media content enhancement, according to one embodiment of the present invention.

The present application is directed to systems and methods for providing media content enhancement. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

The present inventors realize that the conventional approach to providing a consumer software application producing a small viewing window on a consumer's television screen that displays graphics and/or text promoting a particular media content or media content source, i.e., a "widget," is substantially deficient. One significant deficiency is that conventional widgets receive no information regarding the media content being presented to the viewer. As a result, conventional widgets may be utilized by users of the presentation unit, either intentionally or inadvertently, in a way that distracts from or interferes with the media content being presented. In response to the deficiencies in the conventional art, the present inventors herein disclose an approach that implements what is in effect a smart widget, configured to identify the media content being displayed by the presentation unit, and to control its own display features in a manner that enhances, rather than interferes with or distracts from, the media content presentation.

FIG. 1 shows a block diagram of example system 100 for providing media content enhancement, according to one embodiment of the present invention. In the embodiment of FIG. 1, system 100 comprises presentation unit 130 and smart widget 140 on presentation unit 130. System 100 is shown in combination with media content provider 110 providing media content 112, and content enhancement server 120 storing enhancement data 122. As shown in FIG. 1, system 100 may be located remotely from content enhancement server 120 and may access content enhancement server 120 via network 102, which may be a packet network such as the Internet, for example.

It is noted that although the expression "smart widget" is useful for describing aspects of the present invention, more generally the expression smart widget, as used herein, refers to a media content enhancement module configured for use by a presentation unit, such as presentation unit 130, in FIG. 1. Although the present application will repeatedly describe embodiments of the present invention using the expression smart widget, it is to be understood that in each instance, Applicants are referring to a content enhancement module.

Continuing with the embodiment shown in FIG. 1, presentation unit 130, which may be a television (TV), for example, is configured to receive and display media content 112 from media content provider 110. Media content provider 110 may be a network TV broadcaster, cable TV provider, or satellite TV provider, for example. FIG. 1 shows presentation unit 130 receiving media content 112 directly from media content provider 110, but that representation is provided merely for conceptual clarity. Although not shown in FIG. 1, it should be understood that in that embodiment media content 112 would likely be received and processed by one or more additional hardware elements. For example a cable tuner or satellite set-top box connected to presentation unit 130 would typically receive and process media content 112 prior to its display by presentation unit 130. Moreover, in some embodiments, system 100 might include a smart widget insertion unit configured to introduce smart widgets to media content 112 prior to its reception by presentation unit 130. Media content 112 may include entertainment content such as TV programming and movies, instructional content, informational content, advertising content, and/or interactive content, for example.

Presentation unit 130 is further configured to use assets of smart widget 140, which will be further described below, to identify media content 112 and obtain enhancement data including instructions for enhancing media content 112. As shown in FIG. 1, in one embodiment, presentation unit 130 is configured to access content enhancement server 120 in order to receive enhancement data 122 for media content 112 over network 102. In some embodiments, smart widget 140 may include enhancement data for media content 112 in a local cache (not shown in FIG. 1). That cached enhancement data may be included in smart widget 140 as original data provided with smart widget 140, or it may be data stored as a result of previous receipt over network 102. For example, where a viewer repeatedly watches a media content stored on presentation unit 130, such as through use of a digital video recorder (DVR), for example, smart widget 140 may be configured to recognize the media content and retrieve the enhancement data from its own cache, long-term memory, or another local storage resource available to smart widget 140, such as a memory storage of presentation unit 130.

Enhancement data 122, which may comprise supplemental content such as additional entertainment or advertising content, or content in the form of interactive user games, for example, is provided to compliment and enhance the presentation of media content 112. In addition, or alternatively, enhancement data 122 comprises instructions for use of smart widget 140 during display of media content 112 by presentation unit 130.

Figure 2:
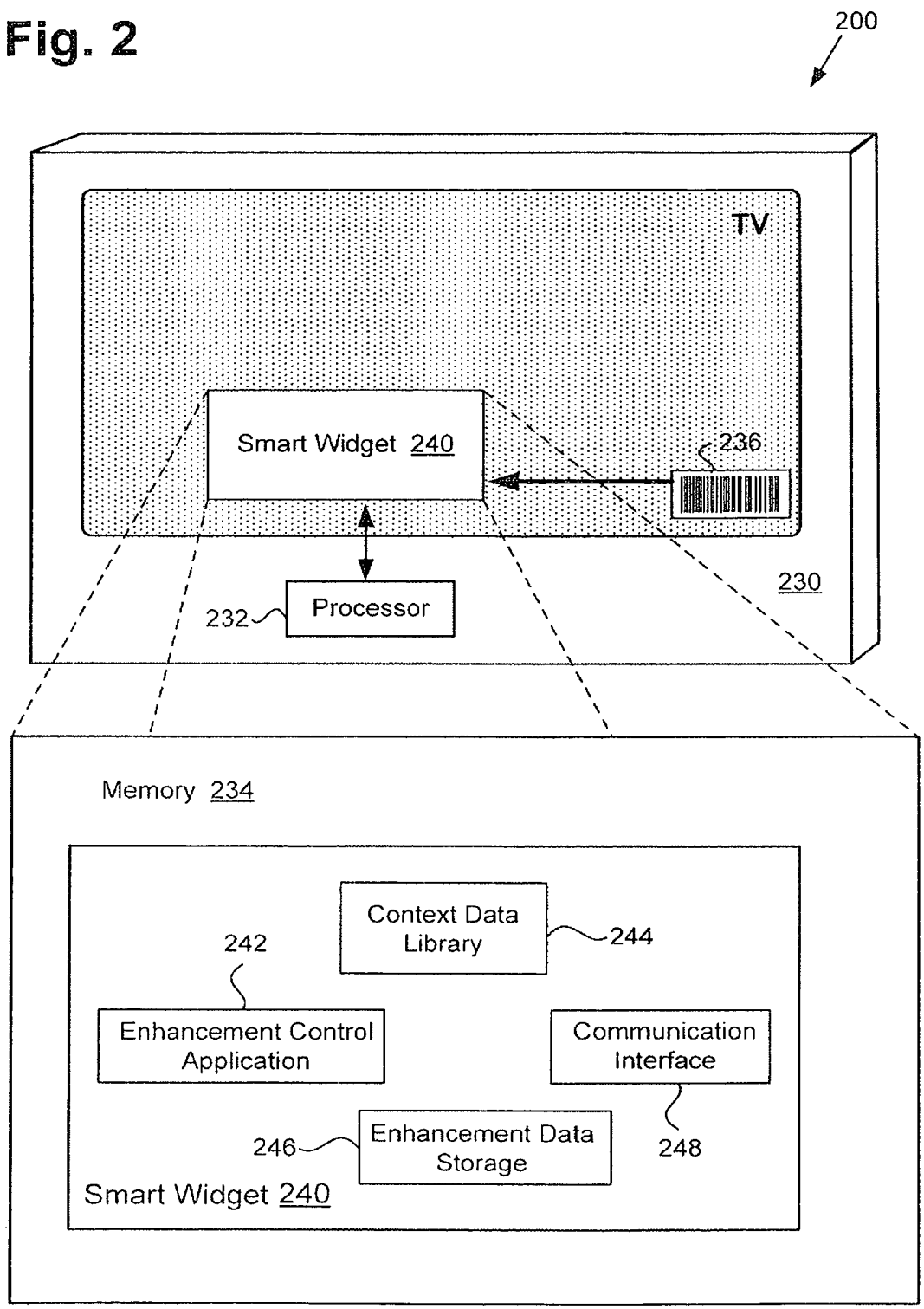
FIG. 2 shows a more detailed example of a system for providing media content enhancement, according to an embodiment of the present invention.

Turning now to FIG. 2, FIG. 2 shows a more detailed example of a system for providing media content enhancement, according to an embodiment of the present invention. System 200 includes presentation unit 230 including memory 234 and processor 232, and smart widget 240 stored in memory 234 and executable to be displayed on presentation unit 230 to enhance media content presented there. FIG. 2 may be viewed as providing a more detailed representation of the elements of system 100, in FIG. 1. Thus, presentation unit 230 and smart widget 240, in FIG. 2, correspond respectively to presentation unit 130 and smart widget 140, in FIG. 1. As shown in FIG. 2, smart widget 240 includes enhancement control application 242, context data library 244, enhancement data storage 246, and communication interface 248. Also shown in FIG. 2 is context data 236, represented in FIG. 2 as a visible barcode displayed on presentation unit 230.

The operation of systems 100 and 200 will now be described in conjunction with FIG. 3, which presents a method for use by a content enhancement module controlled by a presentation unit processor, such as smart widget 240 controlled by processor 232 of presentation unit 230, for providing media content enhancement, according to one embodiment of the present invention. Certain details and features have been left out of flowchart 300 that are apparent to a person of ordinary skill in the art. For example, a step may consist of one or more substeps or may involve specialized equipment or materials, as known in the art. While steps 310 through 350 indicated in flowchart 300 are sufficient to describe one embodiment of the present method, other embodiments may utilize steps different from those shown in flowchart 300, or may include more, or fewer steps.

Referring to step 310 of flowchart 300 and FIGS. 1 and 2, step 310 of flowchart 300 comprises reading context data 236 describing media content 112 and received by presentation unit 230. Step 310 may be performed by smart widget 240, utilizing enhancement control application 242 executed under the control of processor 232, for example. As shown FIG. 2, in one embodiment, context data 236 may take the form of a visible image, such as a barcode, appearing on the display of presentation unit 230. More generally, context data 236 need merely be received by presentation unit 230. One possible way to insure reception of context data 236 by presentation unit 230 is to embed context data 230 in the audiovisual data provided to presentation unit 230 by media content 112. Thus, in one embodiment, context data 236 may appear briefly, e.g., for the first few frames of presentation, as a graphic on the display of presentation unit 230. In another embodiment, context data 236 could be displayed as a code in a closed captioning window accompanying the presentation, or as a graphic outside of the viewing frame of a viewer of presentation unit 230.

Context data 236 comprises data describing media content 112 and provides a context for the media content enhancement to be provided by smart widget 240. In one embodiment, context data 236 may comprise various codes corresponding to the identity of media content 112, the actions to be taken by smart widget 240, and enhancement data 122 required for performance of the media content enhancement by smart widget 240. For example, in one specific embodiment, context data 236 may comprise three codes, the first code describing media content 112, the second code describing a portion or portions of media content 112 during which smart widget 240 is to provide content enhancement, and the third code corresponding to actions to be taken by smart widget 240 to provide content enhancement.

The example method of flowchart 300 continues with step 320, which comprises processing context data 236 to identify media content 112. Step 320 may be performed by smart widget 240, utilizing enhancement control application 242 executed under the control of processor 232. In one embodiment, processing of context data 236, in step 320, may comprise utilizing a database of smart widget 240 to identify media content 112 locally. For example, smart widget 240 can be configured to include context data library 244, from which the identity of media content 112 can be determined from context data 236 read in step 310.

In other embodiments, processing of context data 236, in step 320, may comprise sending all or a portion of context data 236, e.g., the portion containing the identification code of media content 112, to a remote server. For example, smart widget 240 can be configured to include communication interface 248 to enable communication with content enhancement server 120 through presentation unit 230 connected to network 102.

Flowchart 300 continues with step 330, which comprises requesting enhancement data 122 corresponding to media content 112. As was the case for steps 310 and 320, step 330 may be performed by smart widget 240, utilizing enhancement control application 242 executed under the control of processor 232. The request for enhancement data 122, issued in step 330, may be sent to a local or a remote source of enhancement data 122. In some embodiments, enhancement data 122 may reside in enhancement data storage 246 of smart widget 240. Enhancement data storage 246 of smart widget 240 may include either or both of an enhancement data cache and an enhancement data long-term memory. In some of those embodiments, enhancement data 122 may reside in the long-term memory of smart widget 240, having been loaded onto smart widget 240 prior to distribution of smart widget 240 to presentation unit 230. In still other embodiments, the request for enhancement data 122 may comprise sending a request over network 102 to a remote source of enhancement data 122, such as content enhancement server 120, for example.

The example method of flowchart 300 continues with step 340, comprising receiving enhancement data 122 including instructions for enhancement of media content 112. In embodiments in which enhancement data 122 is stored locally, receiving enhancement data 122 in step 340 may further comprise retrieving enhancement data 122 from a local memory storage. In those embodiments, step 340 may be performed by smart widget 240, utilizing enhancement control application 242 executed under the control of processor 232, and may include retrieving enhancement data 122 from memory 234 of presentation unit 230, or from enhancement data storage 246 of smart widget 240, for example. Alternatively, when enhancement data 122 is not stored locally, e.g., not on either of memory 234 or enhancement data storage 246, step 340 may comprise receiving enhancement data 122 over network 102, such as from content enhancement server 120. In those latter embodiments too, step 340 may be performed by smart widget 240, utilizing enhancement control application 242 executed under the control of processor 232.

Moving on to step 350 of flowchart 300, step 350 comprises executing instructions received in enhancement data 122 to enhance media content 112 displayed by presentation unit 230. Step 350 may be performed by smart widget 240, utilizing enhancement control application 242 executed under the control of processor 232. In one embodiment, for example, where processing of context data 236 is performed locally using context data library 244 and in which enhancement data 122 is retrieved locally from enhancement data storage 246, enhancement control application 242 is configured to utilize those local resources to provide the enhancement of media content 112.

According to the embodiment of flowchart 300, enhancement of media content 112 is provided as a result of executing instructions included in enhancement data 122 received in step 340. As previously described, enhancement data 122 may comprise supplemental content such as additional entertainment or advertising content, or content in the form of interactive user games, for example, in addition to instructions for enhancing media content 112. In some embodiments, executing instructions for enhancement of media content 112, in step 350, may result in generation of one or more display images to enhance media content 112.

For instance, where media content 112 is advertising content, step 350 may comprise displaying supplemental content extending the advertisement, or introducing an interactive component to the advertisement. Where media content 112 is television programming or movie content, step 350 may comprise displaying supplemental content such as fun facts about the actors and/or locations associated with the movie, for example. It is noted that display of supplemental content as part of enhancing media content 112 can result in display of one or more visual images including still text, still graphics, and dynamic graphics such as animation and/or video clips, for example.

In some embodiments, media content 112 may be enhanced by removal, from a display of presentation unit 230, of any visual images other than those comprised by media content 112. In those embodiments, step 350 may result in removal of an image corresponding to smart widget 240 from the display of presentation unit 230, for example. Moreover, in some embodiments, step 350 may effectively deactivate smart widget 240, on a temporary basis, in order to prevent a viewer from interrupting or interfering with the presentation of media content 112 through interaction with smart widget 240.

Thus, the present application discloses systems and methods for providing media content enhancement. By introducing a smart widget operable under the control of a presentation unit processor, the present inventive concepts disclose an approach that coordinates enhancements provided by the smart widget with the media content being displayed by the presentation unit. Moreover, because the smart widget disclosed by the present application is configured to receive information identifying the media content viewed by a consumer, the smart widget may be further implemented to provide valuable market research data to assist media content providers and advertisers to deliver the content most valued by consumers.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A system for providing an enhancement of a media content displayed by a presentation unit of the system, the system comprising:
    the presentation unit to receive and display the media content, the presentation unit including a memory and a presentation unit processor;
    a content enhancement software module stored in the memory, the content enhancement software module including a context data library used for identifying the media content, wherein the presentation unit processor executes the content enhancement software module to:
        read context data embedded in audio-visual data provided to the presentation unit by the media content;
        process the context data to obtain a plurality of codes including a first code, a second code and a third code, wherein the first code identifies the media content, the second code describes at least a portion of the media content during which the content enhancement is to be provided from the context data, and the third code describes actions to be taken by the content enhancement software module to provide content enhancement;
        transmit a request, including the first code, to a content enhancement server over a network for obtaining enhancement data corresponding to the media content; and
        receive the enhancement data corresponding to the code from the content enhancement server, in response to transmitting the request;
    the presentation unit processor to execute instructions received in the enhancement data to enhance the media content displayed by the presentation unit.

2. The system of claim 1, wherein the presentation unit comprises a television (TV).

3. The system of claim 1, wherein the media content comprises television programming content.

4. The system of claim 1, wherein the media content comprises advertising content.

5. The system of claim 1, wherein the content enhancement software module further includes:
    an enhancement data storage; and
    an enhancement control application to utilize the context data library and the enhancement data storage to provide enhancement of the media content.

6. The system of claim 1, wherein the request further includes the second code.

7. The system of claim 1, wherein the content enhancement software module includes a communication interface.

8. The system of claim 1, wherein the plurality of codes are displayed outside of a viewing frame of the presentation unit.

9. The system of claim 1, wherein the plurality of codes are included in a closed captioning window.

10. A method for use by a content enhancement software module for execution by a presentation unit processor, the content enhancement software module including a context data library used for identifying a media content, the method comprising:
    reading a context data received by the presentation unit, the context data describing the media content provided for display by the presentation unit, wherein the context data being embedded in audio-visual data provided to the presentation unit by the media content;
    processing the context data to obtain a plurality of codes including a first code, a second code and a third code, wherein the first code identifies the media content, the second code describes at least a portion of the media content during which the content enhancement is to be provided from the context data, and the third code describes actions to be taken by the content enhancement software module to provide content enhancement;
    transmitting a request, including the first code, to a content enhancement server over a network for obtaining enhancement data corresponding to the media content;
    receiving the enhancement data corresponding to the code from the content enhancement server, in response to the transmitting of the request; and
    executing instructions received in the enhancement data to enhance the media content displayed by the presentation unit.

11. The method of claim 10, wherein the presentation unit comprises a television (TV).

12. The method of claim 10, wherein the media content comprises television programming content.

13. The method of claim 10, wherein the media content comprises advertising content.

14. The method of claim 10, wherein the enhancement data further comprises supplemental content for enhancing the media content.

15. The method of claim 10, wherein executing the instructions received in the enhancement data results in generation of at least one display image for presentation with the media content.

16. The method of claim 10, wherein executing the instructions received in the enhancement data results in generation of dynamic graphics for presentation with the media content.

17. The method of claim 10, wherein executing the instructions received in the enhancement data results in removal of an image corresponding to the content enhancement software module from a display of the presentation unit.

18. The method of claim 10, further comprising retrieving the enhancement data from an enhancement data storage of the content enhancement software module.

19. The method of claim 10, the request further includes the second code.

* * * * *